United States Patent [19]

Danielson

[11] Patent Number: 5,192,718
[45] Date of Patent: Mar. 9, 1993

[54] LEAD SILICATE GLASSES

[75] Inventor: Paul S. Danielson, Corning, N.Y.

[73] Assignee: Corning Incorporated, Corning, N.Y.

[21] Appl. No.: 782,528

[22] Filed: Oct. 24, 1991

[51] Int. Cl.$^5$ .............................................. C03C 3/105
[52] U.S. Cl. ....................................... 501/60; 501/62; 313/480
[58] Field of Search ............................ 501/60, 62, 69; 313/480

[56] References Cited

U.S. PATENT DOCUMENTS

| | | | |
|---|---|---|---|
| 2,009,793 | 7/1935 | Sanchez-Vello | 65/86 |
| 2,692,833 | 10/1954 | Armistead | 501/61 |
| 3,464,932 | 9/1969 | Connelly et al. | 501/57 X |
| 4,174,490 | 11/1979 | Van Erk et al. | 252/478 X |
| 4,520,115 | 5/1985 | Speit et al. | 501/61 X |
| 4,677,081 | 6/1987 | Thomas et al. | 501/62 X |

FOREIGN PATENT DOCUMENTS

| | | |
|---|---|---|
| 574275 | 12/1945 | United Kingdom . |
| 1321441 | 6/1973 | United Kingdom . |
| 1397348 | 6/1975 | United Kingdom . |

Primary Examiner—Karl Group
Attorney, Agent, or Firm—Milton M. Peterson; Clinton S. Janes, Jr.

[57] ABSTRACT

A family of lead silicate glasses particularly adapted to drawing of tubing for use in the neck section of a cathode ray tube. The glasses have internal liquidi below 750° C., electrical resistivities over 8.0 ohm-cm (Log $R_{350° C.}$) and linear x-ray absorption values of at least 95 $cm^{-1}$ at a wavelength of 0.6 Angstrom units. Their compositions consist essentially of, in weight percent as calculated on an oxide basis, 46–51% $SiO_2$, 0.5–2% $Al_2O_3$, 0.3–3% $Na_2O$, 9–13% $K_2O$, 2.5–6% SrO, 1–4% BaO, 30–33% PbO, 0–2% ZnO and 0.3–1% $Sb_2O_3$.

12 Claims, 1 Drawing Sheet

LEAD SILICATE GLASSES

FIELD OF THE INVENTION

The field is x-ray absorbing, lead silicate glasses, and tubing for the neck section of a cathode ray tube.

BACKGROUND OF THE INVENTION

A conventional cathode ray tube for television reception is composed of a faceplate, a funnel, a neck and an electron gun. These several components are commonly formed separately, hermetically sealed together, and the assembly evacuated to form a completed tube.

A cathode ray tube, especially a television receiver tube for color reception, operates under a high voltage and emits strong x-radiation. The hazardous nature of this radiation has necessitated the development of glasses capable of absorbing such radiation. Advances in the television art, particularly in the area of color receivers, have led to use of ever increasing voltages in the tube operation. In turn, this has required glasses with increased x-ray absorption capability. The glass neck of a tube, being thinner than the faceplate, must have a much higher x-ray absorption value than is required for a faceplate. Currently absorption values for the neck glass of at least 95 cm$^{-1}$ at 0.6 Angstrom units are desired.

A further property of critical concern in a cathode ray tube glass, especially a neck glass, is electrical resistivity. Values of log R at 350° C. of at least 8.0 ohm-cm are considered desirable. To achieve such values, control of alkali metal oxides is exercised. Thus, lithia ($Li_2O$) is customarily excluded from a glass and soda ($Na_2O$) is minimized.

The neck portion of a cathode ray tube is customarily drawn from a glass melt as tubing. It is conventional practice to draw such tubing by a Vello or a downdraw process. The tubing is drawn continuously from the forehearth and bowl of a continuous glass tank. Such a process is depicted and described, for example, in U.S. Pat. Nos. 2,009,326 and 2,009,793 (Vello) and at pages 210-211 of the glass text, *Glass: The Miracle Maker.* C. J. Phillips, Pitman Publishing Corporation (1941).

An unwanted phenomenon of critical importance in drawing glass tubing is devitrification, that is, a tendency for the glass to crystallize, at the tube drawing temperature. A glass can be kept adequately hot in the tank to avoid devitrification. Once on the draw, tubing cools sufficiently rapidly that devitrification is not a problem. The critical area is the forehearth/bowl area as the glass exits to the draw.

Commercial glasses, with otherwise excellent properties, have been found to have a tendency to devitrify in the critical forehearth/bowl area. This may lead to unacceptable crystal inclusions in the glass tubing. More troublesome is a tendency for crystal buildup to occur in the forming region, that is, around the bowl opening. This causes distortion in the tubing shape and complete loss of product.

It then becomes necessary to shut down the draw and apply excess heat to the bowl to melt and flush out the crystal deposits. Such remedial action is not only costly and time-consuming, but is technically unsatisfactory as well. Sufficiently high temperatures to do a thorough cleansing job can not be employed without endangering the bowl structure.

Accordingly, an intensive compositional search has been undertaken to find a glass family having more favorable internal liquidus characteristics. At the same time, of course, other required properties, in particular, x-ray absorption and electrical resistivity values, had to be retained. It is the basic purpose of my present invention to provide a narrow composition family of lead silicate glasses that meet the need.

SUMMARY OF THE INVENTION

The invention resides in a family of lead silicate glasses that have internal liquidi below 750° C., electrical resistivities over 8.0 ohm-cm (Log $R_{350°\ C.}$) and x-ray absorption values of at least 95 cm$^{-1}$ as measured at 0.6 Angstrom units, the glasses consisting essentially of, in weight percent as calculated on the oxide basis, 46-51% $SiO_2$, 0.5-2% $Al_2O_3$, 0.3-3% $Na_2O$, 9-13% $K_2O$, 2.5-6% SrO, 1-4% BaO, 30-33% PbO and 0.3-1% $Sb_2O_3$. Preferably, the glass also contains up to 2% ZnO. A preferred range of compositions consists essentially of 47-50% $SiO_2$, 0.5-2.0% $Al_2O_3$, 0.3-1.0% $Na_2O$, 12-13% $K_2O$, 2.5-3.5% SrO, 1-3% BaO, 0.5-1.5% ZnO, 30-32% PbO and 0.3-1% $Sb_2O_3$.

Another aspect of the invention is a length of glass tubing drawn from a glass belonging to the lead silicate family defined above.

A further aspect resides in a cathode ray tube composed of a faceplate, a funnel, a neck and an electron gun, the neck being formed from a glass belonging to the lead silicate family defined above.

PRIOR ART

The relative effectiveness of various oxides in absorbing x-radiation has been explored in depth in the development of cathode ray tube, faceplate glasses. There, lead oxide is usually minimized, or avoided. Otherwise, the glass tends to darken under the influence of x-rays and electrons. The relationship of SrO and BaO is discussed in detail in U.S. Pat. No. 3,464,932 (Connelly et al.). U.S. Pat. No. 4,520,115 (Speit et al.) discloses lead silicate glasses claimed to be resistant to discoloration.

The utility of lead-potash-soda silicate glasses in providing high electrical resistivity values was recognized as early as U.S. Pat. No. 2,019,817 (Taylor). See also U.S. Pat. No. 2,692,833 (Armistead) and United Kingdom Patent No. 574,275 (Partridge).

The following patents disclose lead silicate glasses particularly adapted to cathode ray tube production, more particularly, the neck and/or funnel portions:
U.S. Pat. No. 4,174,490 (Van Erk et al.)
U.S. Pat. No. 4,677,081 (Thomas et al.)
United Kingdom No. 1,321,441 (Sanner)
United Kingdom No. 1,397,348 (Asahi Glass)

BRIEF DESCRIPTION OF THE DRAWINGS

In the accompanying drawing.

DESCRIPTION OF THE INVENTION

Figure 1:
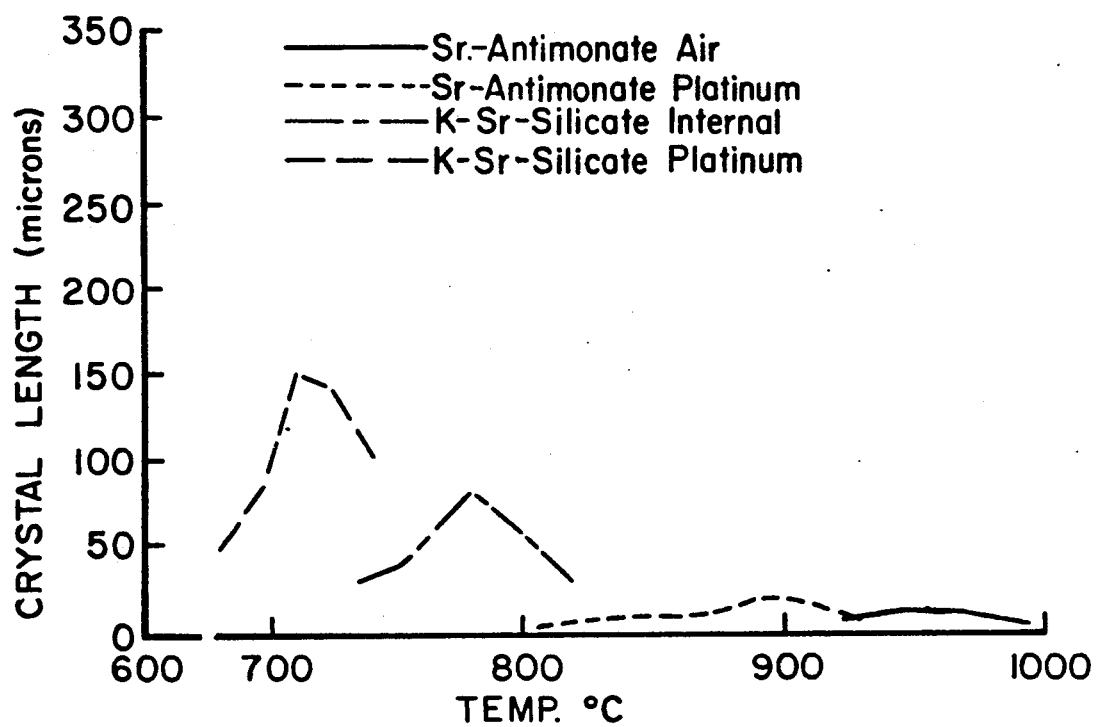
FIG. 1 is a graphical representation of data obtained from a devitrification study made on a prior art glass.

The present invention is embodied in a narrowly defined family of glasses in the potassium-strontium-lead silicate system. These glasses have been modified by small additions of barium, preferably in conjunction with zinc. Key features of these glasses are high liquidus-viscosity relationships and low liquidus temperatures.

These features lessen the tendency of the glass to devitrify. More particularly, the tendency to devitrify in the temperature range of 750°-850° C., the range of forming temperatures for neck tubing, is lessened. Thus, the liquidus temperature, that is, the temperature at which a glass tends to crystallize as it cools, is moved away from the temperature at which tubing is formed. This, in turn, minimizes crystal formation at the bowl outlet. Thereby, the length of a tubing run between shutdowns for bowl cleaning is increased. This is a major factor in increased productivity, and hence profitability.

At the same time, the modifications of existing neck glasses are sufficiently small so that other required properties are maintained, and may even be enhanced. These properties include an electrical resistivity (Log $R_{350° C.}$) of at least 8.0 and a linear x-ray absorption value of at least 95 cm$^{-1}$ at a wavelength of 0.6 Angstrom units.

The glass family of the invention is defined by the following composition ranges in terms of calculated oxide contents in weight percent:

| | |
|---|---|
| 46-51% | SiO$_2$ |
| 0.5-2% | Al$_2$O$_3$ |
| 0.3-3% | Na$_2$O |
| 9-13% | K$_2$O |
| 2.5-6% | SrO |
| 1-4% | BaO |
| 0-2% | ZnO |
| 30-33% | PbO |
| 0.3-1% | Sb$_2$O$_3$ |

Studies that led to the present invention were conducted with a current commercial glass as a basis for departure and/or modification. The composition of this glass is given as Example 9 in Table II, infra.

These studies revealed that a remarkable improvement in liquidus behavior was obtained when a BaO content of 1-4% was maintained in lieu of SrO in the glass. This improvement could be further enhanced by the concurrent presence of up to 2% ZnO, preferably about 1%, in the glass. ZnO is a relatively expensive batch material, so that care is taken to avoid an excess. Since the x-ray absorption behaviors of BaO and ZnO are similar to those of SrO and K$_2$O, these oxides of Ba and Zn may be incorporated in a SrO-K$_2$O neck glass without loss of x-ray protection.

Alkali metal oxides provide control of physical properties such as viscosity-temperature and thermal expansion coefficient. K$_2$O is preferred because of its beneficial x-ray absorption. In general, soda (Na$_2$O) can be tolerated in amounts up to 3%, but preferably not over 1%. At least 0.3% is introduced by the use of feldspar as a batch ingredient. Lithia (Li$_2$O) unduly softens the glass, raises expansion coefficient, and adversely affects the liquidus. Hence, it is normally avoided.

It is commonly accepted that a percent or two of Al$_2$O$_3$ tends to stabilize a glass. Antimony oxide (Sb$_2$O$_3$) is present as a fining agent in view of current efforts to avoid use of arsenic.

The invention is further described with respect to specific embodiments. TABLE 1 sets forth, in calculated parts by weight on the oxide basis, several illustrative compositions. Also presented are various characteristic properties of glasses corresponding to the compositions. These include the standard viscosity temperature values: softening point (Soft), annealing temperature (Anneal) and strain point (Strain), the thermal expansion coefficient (25°-300° C.)$\times 10^{-7}$/°C. (Exp.), the internal liquidus (Int. Liq.) and electrical resistivity (E.R.) as Log R at 350° C.

TABLE 1

| | 1 | 2 | 3 | 4 | 5 | 6 | 7 | 8 |
|---|---|---|---|---|---|---|---|---|
| Oxide | | | | | | | | |
| SiO$_2$ | 48.1 | 49.3 | 46.8 | 49.1 | 48.6 | 49.6 | 48.9 | 48.4 |
| Al$_2$O$_3$ | 0.7 | 0.7 | 0.7 | 0.7 | 1.7 | 0.7 | 0.7 | 1.7 |
| Na$_2$O | 2.5 | 0.8 | 1.4 | 0.3 | 0.8 | 0.6 | 0.3 | 1.0 |
| K$_2$O | 9.1 | 12.3 | 10.7 | 12.4 | 12.3 | 12.4 | 12.4 | 12.3 |
| SrO | 3.0 | 4.2 | 3.0 | 5.5 | 4.2 | 3.0 | 3.0 | 3.0 |
| BaO | 3.6 | 1.8 | 3.6 | 0.0 | 1.8 | 1.8 | 2.8 | 1.8 |
| PbO | 30.6 | 30.4 | 30.4 | 31.5 | 30.2 | 30.4 | 30.4 | 30.3 |
| ZnO | 1.0 | 0.0 | 2.0 | 0.0 | 0.0 | 1.0 | 1.0 | 1.0 |
| Sb$_2$O$_3$ | 0.5 | 0.5 | 0.5 | 0.5 | 0.5 | 0.5 | 0.5 | 0.5 |
| Properties | | | | | | | | |
| Soft Pt. | 639 | 650 | 656 | 664 | 658 | 658 | 665 | 658 |
| Anneal | 464 | 469 | 474 | 482 | 475 | 474 | 482 | 471 |
| Strain | 427 | 432 | 436 | 442 | 437 | 435 | 441 | 432 |
| Expans | 96.8 | 99.2 | 99.2 | 97.6 | 98.6 | 97.6 | 96.9 | 98.3 |
| Int. Liq | 730 | 735 | 735 | 745 | 700 | NF | NF | 630 |
| E.R. | — | — | — | — | 8.4 | 8.3 | 8.3 | 8.3 |

NF = None Found

A two pound (approximately 1 kg) glass melt of each composition was prepared by tumble mixing carefully weighed batches of production-type glass batch materials, melting at 1550° C. in Pt crucibles in electric furnaces, stirring for homogeneity using a Pt stirrer, and annealing a poured slab for subsequent sample generation.

Physical properties (softening, anneal, and strain points; thermal coefficient; density) were determined using the customary ASTM methods. X-ray absorption coefficient was calculated (for 0.6 Angstrom radiation) using the measured density and well known compositional factors.

An estimate of liquidus temperature (actually maximum temperature of devitrification) was made by a modification of the ASTM 24-hour gradient Pt boat method. Increased accuracy is obtained by examining the entire resulting slab of test glass, rather than simply a thin section, at the Pt and air interfaces and the internal region. In some cases, crystal sizes were measured and plotted against temperature to estimate growth rates. The primary internal crystal phase was determined to be a strontium potassium silicate compound, in agreement with tests of production glass. Since many of the compositions reported here tend to be very difficult to nucleate, another test procedure was also used in which an entire sample was nucleated well below the liquidus, and then placed in a gradient furnace so that crystal growth and dissolution could be observed below and above (respectively) the true liquidus temperature. In several cases, it was necessary to extend the normal gradient boat test time to 48 or 72 hours.

The invention is further illustrated by six (6) compositions shown in TABLE 2. Corresponding glasses were melted in the same manner as with the compositions of TABLE 1, except that 5 kg (approximately 11 pounds) melts were made to provide a larger supply of glass for testing. Properties are also shown in TABLE 2.

Example 9 is the composition of current production glass mentioned earlier and included for comparison.

TABLE 2

| Oxide | 9 | 10 | 11 | 12 | 13 | 14 |
|---|---|---|---|---|---|---|
| $SiO_2$ | 49.1 | 48.9 | 48.8 | 47.8 | 47.9 | 48.1 |
| $Al_2O_3$ | 0.7 | 0.7 | 0.7 | 1.5 | 0.7 | 0.7 |
| $Na_2O$ | 0.3 | 0.3 | 0.4 | 0.6 | 0.3 | 0.3 |
| $K_2O$ | 12.4 | 12.4 | 12.4 | 12.4 | 12.4 | 12.1 |
| SrO | 5.5 | 3.0 | 3.0 | 3.0 | 3.0 | 3.0 |
| BaO | 0.0 | 2.8 | 1.8 | 1.8 | 2.8 | 2.8 |
| PbO | 31.6 | 30.4 | 31.4 | 31.4 | 31.4 | 31.4 |
| ZnO | 0.0 | 1.0 | 1.0 | 1.0 | 1.0 | 1.0 |
| $Sb_2O_3$ | 0.5 | 0.5 | 0.5 | 0.5 | 0.5 | 0.5 |
| Properties | | | | | | |
| Soft Pt. | 660 | 660 | 660 | 656 | 657 | 659 |
| Anneal | 482 | 478 | 481 | 476 | 473 | 479 |
| Strain | 438 | 433 | 437 | 432 | 430 | 435 |
| Expans | 96.9 | 97.1 | 97.6 | 97.9 | 98.9 | 97.7 |

FIGURES I and II show a graphical representation of liquidus results, plotting crystal size versus temperature for a 72 hour test. FIG. 1 shows the crystallization behavior of the current production glass. The solid and dashed curves between 800° and 1000° C. show the air and Pt interface crystals of a strontium antimonate phase. This phase has very small crystals which appear at temperatures primarily above the temperatures at which tubing is formed. In industrial practice, these crystals have not been observed to hinder the manufacture of neck glasses. The troublesome crystal phase in practice has been the one which appears in the 750° to 850° C. range—the K-Sr-silicate internal phase (dotted line). This is the temperature range nearest the tube draw temperature.

In the graphical representation, crystal size is plotted in microns on the vertical axis. This is the maximum crystal length observed after the test boat is held for 72 hours in a gradient furnace. Temperature in °C. is plotted on the horizontal axis.

Figure 2:
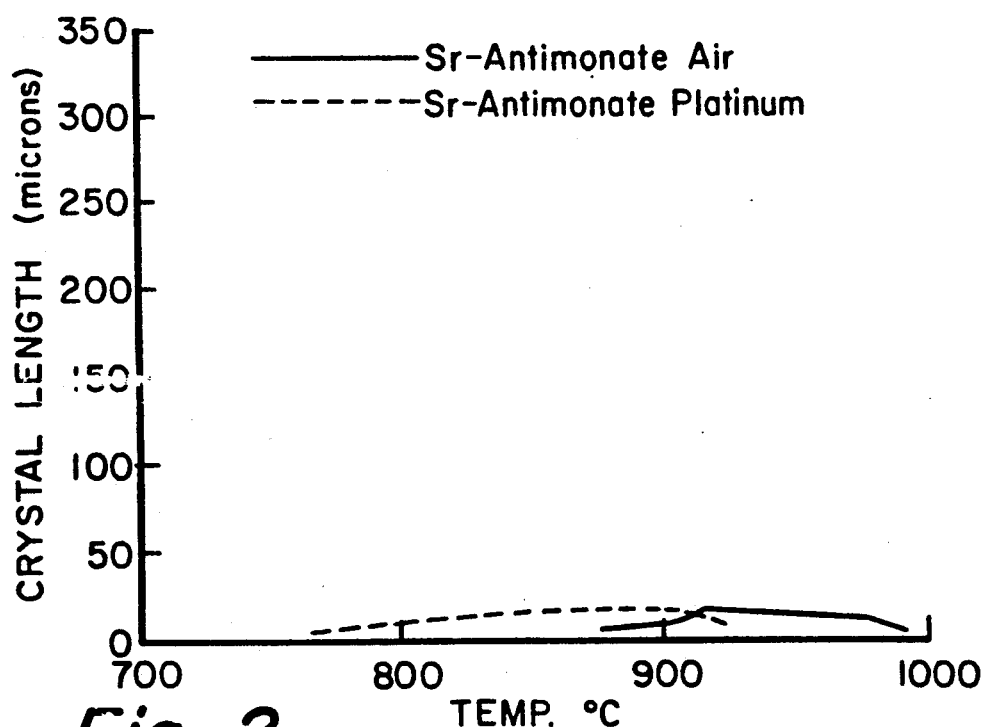
FIG. 2 is a graphical representation of a corresponding study made on a glass of the present invention.

FIG. 2 represents observations made on the glass of Example 12 in TABLE 2, a preferred embodiment. When the glass sample was observed after this test, no evidence of K-Sr-silicate crystals, or any crystalline phase other than the Sr-antimonate phase, was seen.

I claim:

1. A family of lead silicate glasses having internal liquidi below 750° C., electrical resistivities over 8.0 ohm-cm (Log $R_{350°\ C.}$) and linear x-ray absorption values of at least 95 cm$^{-1}$ at a wavelength of 0.6 Angstrom units, the glasses having compositions consisting essentially of, in weight percent as calculated on an oxide basis, 46-51% $SiO_2$, 0.5-2% $Al_2O_3$, 0.3-3% $Na_2O$, 9-13% $K_2O$, 2.5-6% SrO, 1-4% BaO, 30-33% PbO and 0.3-1% $Sb_2O_3$.

2. Lead silicate glasses in accordance with claim 1 wherein the glass compositions additionally include ZnO in an amount not over 2%.

3. Lead silicate glasses in accordance with claim 2 wherein the glass compositions have a total content of SrO+BaO+ZnO in the range of 5-8%.

4. Lead silicate glasses in accordance with claim 1 wherein the compositions consist essentially of 47-50% $SiO_2$, 0.5-2.0% $Al_2O_3$, 0.3-1.0% $Na_2O$, 12-13% $K_2O$, 2.5-3.5% SrO, 1-3% BaO, 0.5-1.5% ZnO, 30-32% PbO and 0.3-1% $Sb_2O_3$.

5. A length of glass tubing drawn from a lead silicate glass melt, the glass having an internal liquidus below 750° C., and electrical resistivity over 8.0 ohm-cm (Log $R_{350°\ C.}$) and a linear x-ray absorption value of at least 95 cm$^{-1}$ at a wavelength of 0.6 Angstrom units, the glass composition consisting essentially of, in weight percent as calculated on an oxide basis, 46-51% SiO , 0.5-2% $Al_2O_3$, 0.3-3% $Na_2O$, 9-13% $K_2O$, 2.5-6% SrO, 1-4% BaO, 30-33% PbO and 0.3-1% $Sb_2O_3$.

6. A length of glass tubing in accordance with claim 5 wherein the glass composition additionally includes ZnO in an amount not over 2%.

7. A length of glass tubing in accordance with claim 6 wherein the glass composition has a total content of SrO+BaO+ZnO in the range of 5-8%.

8. A length of glass tubing in accordance with claim 5 wherein the glass composition consists essentially of 47-50% $SiO_2$, 0.5-2% $Al_2O_3$, 0.3-1% $Na_2O$, 12-13% $K_2O$, 2.5-3.5% SrO, 1-3% BaO, 0.5-1.5% ZnO, 30-32% PbO and 0.3-1% $Sb_2O_3$.

9. A cathode ray tube composed of a faceplate, a funnel, a neck and an electron gun, the neck being formed from a lead silicate glass having an internal liquidus below 750° C., an electrical resistivity over 8.0 ohm-cm (Log $R_{350°\ C.}$) and a linear x-ray absorption value of at least 95 cm$^{-1}$ at a wavelength of 0.6 Angstrom units, the glass composition consisting essentially of, in weight percent as calculated on an oxide basis, 46-51% SiO , 0.5-2% $Al_2O_3$, 0.3-3% $Na_2O$, 9-13% $K_2O$, 2.5-6% SrO, 1-4% BaO, 30-33% PbO and 0.3-1% $Sb_2O_3$.

10. A cathode ray tube in accordance with claim 9 wherein the neck glass composition additionally includes ZnO in an amount not over 2%.

11. A cathode ray tube in accordance with claim 10 wherein the neck glass composition has a total content of SrO+BaO+ZnO in the range of 5-8%.

12. A cathode ray tube in accordance with claim 9 wherein the neck glass composition consists essentially of 47-50% $SiO_2$, 0.5-2% $Al_2O_3$, 0.3-1% $Na_2O$, 12-13% $K_2O$, 2.5-3.5% SrO, 1-3% BaO, 0.5-1.5% ZnO, 30-32% PbO and 0.3-1% $Sb_2O_3$.

* * * * *